Sept. 24, 1929.                J. F. JOHNSON                1,729,444
                                GLAND RUNNER
                             Filed Dec. 3, 1924
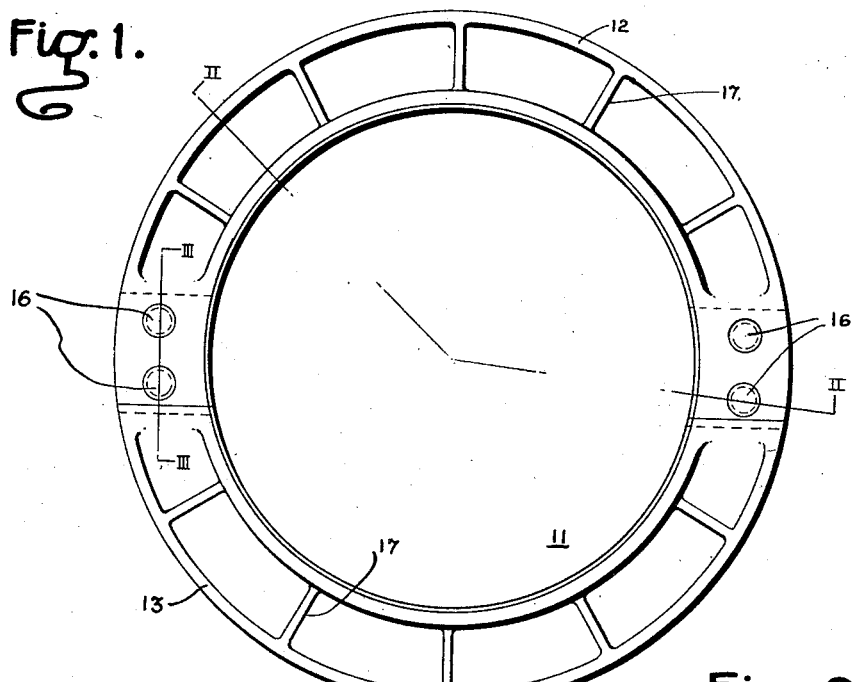
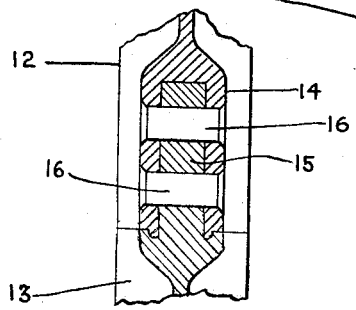
J. F. Johnson
INVENTOR Patented Sept. 24, 1929

1,729,444

UNITED STATES PATENT OFFICE

JOSIAH F. JOHNSON, OF SWARTHMORE, PENNSYLVANIA, ASSIGNOR TO WESTINGHOUSE ELECTRIC & MANUFACTURING COMPANY, A CORPORATION OF PENNSYLVANIA

GLAND RUNNER

Application filed December 3, 1924. Serial No. 753,659.

My invention relates to gland runners, particularly to runners for glands employed in sealing the joint between a rotating and a stationary member, such as a turbine shaft and a turbine casing, and it has for an object to provide a device of the character designated which shall be adapted to be readily pressed, shrunk or applied in similar ways to a rotatable shaft in such a manner that it shall remain fixedly secured thereto for an indefinite period of time, unaffected by continued operation at high rotational velocities and widely varying temperature conditions.

These and other objects of my invention, which will be manifest in the further description thereof, are set forth in the following specification and illustrated in the accompanying drawings in which:

Fig. 1 is a view, in elevation, of one form of my improved gland runner and Figs. 2 and 3 are sectional views taken respectively on the lines II—II and III—III of Fig. 1.

Centrifugal liquid sealing devices or packings are generally recognized as providing a very effective means for preventing leakage of fluid between the rotor and the casing of steam turbines. Apparatus of this character generally includes a runner which is attached to the turbine rotor and adapted to operate in a closed annular chamber communicating with the turbine casing. In operation, the centrifugal action of the rotating runner maintains a quantity of water, which is present in the annular chamber, against the outer walls at a pressure sufficient to prevent leakage of air into the turbine, as under high vacuum conditions, or to prevent steam from leaking out of the turbine, as under atmospheric exhaust conditions.

Very frequently, the construction of the turbine is such that the gland runner must be applied in two portions, which portions are subsequently joined upon their assembly on the rotor. The process of securing the gland runner to the turbine rotor generally consists in pressing or shrinking the joined portions upon the part of the rotor upon which it is to be mounted, the latter process requiring the heating of the runner to a sufficient temperature to secure a maximum amount of elastic stretch. In this way, the runner remains tight upon the rotor.

In the case of a gland runner which is pressed or shrunk upon a shaft, its tightness depends upon the elastic stress in both the ring and the shaft as caused by some elastic stretch of the ring or some elastic compression of the shaft or a combination of both. If such runner and shaft are subjected to temperature changes, when unstressed, the physical dimensions change in accordance with the thermal characteristics of the materials employed. Consequently, in order to so press or shrink a runner upon a shaft that it remains fixedly secured thereto under all operating temperature changes, the runner and shaft must be assembled with a greater amount of elastic stretch of the runner or elastic compression of the shaft or a combination of both than the deformation which would ensue, were the runner not stretched, from changes in operating temperatures. In other words, upon heating of the runner, it would tend to expand and become loose on the shaft; however, as the runner is already stretched on the shaft, the increase in temperature merely takes up a part of the stretch.

In the present case, the expansive strength of the runner is comparatively small as compared with the compressive strength of the shaft and consequently the major portion of the elastic deformation caused by the pressing or shrinking process must necessarily occur in the runner. Since the elastic deformation is approximately directly proportional to the stress, until the elastic limit of the material has been reached, it becomes evident that if the runner is to remain tight under operating temperature changes, it should be so designed as to permit of substantially the maximum amount of elastic deformation, which maximum amount can only occur when the stress in the entire periphery of the runner is equal to its elastic limit.

Heretofore, the usual form of runner has been provided with a connecting joint, the elastic limit of which has been less than that of the remaining periphery of the runner. As a result, only the metal in the joint may reach the elastic limit as a result of temperature changes, the remaining portion of the runner being stressed considerably below its elastic limit. Such a runner, therefore, either does not provide a maximum amount of elastic stretch and may become loosened from the rotor when subjected to extreme changes in temperature, or if originally stretched to a sufficient extent, the elastic limit of the joint is exceeded, causing possible breakage at the joint.

I have, therefore, designed a runner made in sections in which the elastic limit of the joints is at least as great as or equal to the elastic limit of substantially all of the parts of the sections between the joints. Such a joint may be designed, after determining the desired elastic limit, in accordance with known rules of design as set forth in engineering data books. In accordance with such a design, the minimum cross-sectional area of the joint portion of each section is at least as great as or substantially equal to the minimum cross-sectional area of the parts of the sections intermediate the joint portions. The intermediate parts are of substantially uniform cross-sectional area throughout their lengths; hence, they are stretched substantially uniformly throughout their lengths. Such a runner may be so pressed or shrunk upon a shaft that it is stretched to approximately its elastic limit substantially throughout its circumference, and it is therefore secured to the shaft with the maximum practical amount of elastic stretch. Hence, the runner is held firmly on the shaft, and the elastic limit is not exceeded upon temperature changes tending to expand or contract the ring.

Referring to the drawing for an illustration of one form of runner constructed in accordance with my invention, I show a shaft or turbine rotor 10 upon which is assembled a gland runner 11 constructed in accordance with my invention. The gland runner 11 is composed of upper and lower sections 12 and 13 provided respectively with female and male ends 14 and 15. The male and female ends 14 and 15 are interfitting and are secured together in any suitable manner, such as by rivets 16. With a gland runner so constructed, the upper and lower portions may be assembled after which the rivets 16 may be inserted. The runner may then be pressed upon the part of the shaft to which it is to be attached, or it may be heated to a considerable temperature, whereby subsequent cooling and contraction causes the runner to grip the shaft with considerable force.

The upper and lower portions are provided with a plurality of vanes 17 for impelling the sealing liquid. The gland runner is, as illustrated, preferably formed of an H-cross-section, the elastic limit of which is substantially equal to or at least as great as the elastic limit of each joint formed by the interfitting male and female ends 14 and 15 and the connecting rivets 16. It may be noted that in designing the runner in accordance with this relation, the minimum cross section of the joint portion of each section, that is, a section through either end 14 or 15 at the rivet opening, is as great as the cross section through the major portions of the intermediate parts of the sections, having in mind that the joint portions are made of the same material as the intermediate portions. This will be apparent from a consideration of the rules of design of joints as set forth in engineering data books. The design is such that upon applying heat or pressure to the entire periphery of the runner, the resultant expansion or contraction is substantially uniform throughout, or at least is distributed to the major portions of the runner to avoid exceeding the elastic limit of any part.

It is to be noted that in speaking of the runner in this specification, the expression "elastic limit" is used to mean, unless otherwise stated, total elastic limit or limit of total stress without permanent deformation, as distinguished from elastic limit per unit area.

While I have described my invention as applied to runners for turbine glands, it is to be understood that its use is not confined solely thereto, but that it may be employed for the impellers of centrifugal pumps or for other rotating machinery in which it is found advisable to assemble the rotating member upon the shaft in two or more parts and to secure the same by a pressing or shrinking process.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claim.

What I claim is:

The combination with a shaft, of a runner stretched circumferentially and gripping the shaft, said runner comprising a plurality of arcuate sections formed with terminal joint portions and means for securing the joint portions together, the elastic limit of the joints being at least as great as the minimum elastic limit of the parts of the sections intermediate the joints, said intermediate parts being of substantially uniform elastic limit throughout their lengths, whereby said intermediate parts take a share of the stretch at least as great as their proportionate circumferential extent.

In testimony whereof, I have hereunto subscribed my name this twenty-first day of November, 1924.

JOSIAH F. JOHNSON.